W. G. LOONEY.
LINEMAN'S POST SADDLE.
APPLICATION FILED FEB. 20, 1918.
1,278,954.
Patented Sept. 17, 1918.
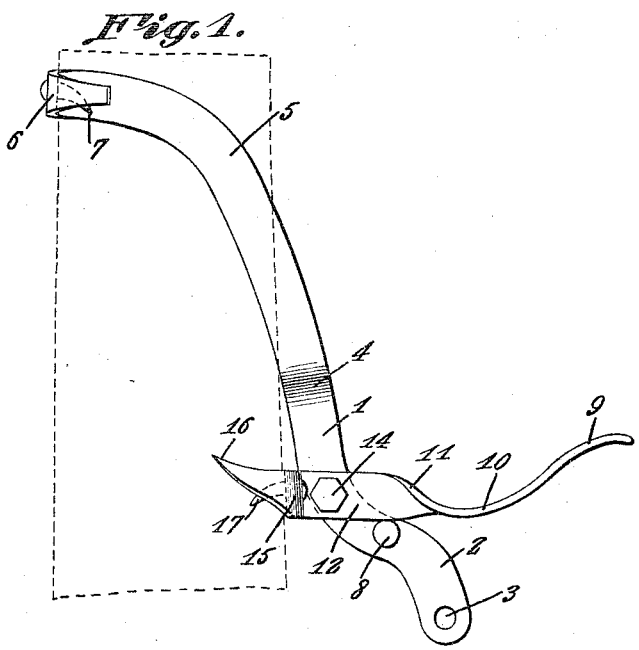
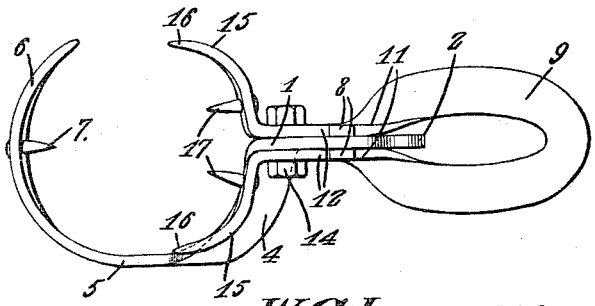
W. G. Looney, Inventor

UNITED STATES PATENT OFFICE.

WILLIAM G. LOONEY, OF DESKINS, VIRGINIA.

LINEMAN'S POST-SADDLE.

1,278,954.  Specification of Letters Patent.  Patented Sept. 17, 1918.

Application filed February 20, 1918. Serial No. 218,291.

*To all whom it may concern:*

Be it known that I, WILLIAM G. LOONEY, a citizen of the United States, residing at Deskins, in the county of Buchanan and State of Virginia, have invented a new and useful Lineman's Post-Saddle, of which the following is a specification.

The device forming the subject matter of this application is adapted to be mounted on a pole, a post, a tree or the like to afford a support for a workman, the construction being such that the workman may assume a sitting posture, the device being so constituted that it will retain a firm grip on the post.

It is within the province of the disclosure to improve generally and to enhance the utility of devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a device constructed in accordance with the invention; and Fig. 2 is a bottom plan of the device.

The structure forming the subject matter of this application preferably is made of metal throughout and includes a main member embodying an upright shank 1, the lower end of which is offset, outwardly, to form a hanger 2 provided with an opening 3 in which a pot of paint or a kit of tools may be suspended. The upper end of the shank 1 merges into a laterally offset extension 4 continued forwardly to form inclined arm 5 terminating in a transverse curved finger 6. The parts 4, 5 and 6 may be designated generally as a pole-inclosing hook. The finger 6 forms the bill of the hook and projecting from the inner curve of the bill is a downwardly inclined prong 7. The hanger 2 is supplied with a stop 8 projecting laterally beyond both sides of the hanger.

The invention includes a support comprising a U-shaped part 9 forming a seat, and concaved as shown at 10 to fit the anatomy of the operator. The side portions of the part 9 are twisted as shown at 11 to fashion a pair of arms 12 located on opposite sides of the shank 1 and united therewith by a pivot element 14, the arms 12 terminating in laterally extending curved branches 15 and carrying inwardly projecting prongs 17, the branches 15 terminating in upwardly extended points 16.

In practical operation, the hook 4—5—6 is placed about the pole and branches 15 of the support are straddled on the pole. When the operator occupies the seat 9, the prongs 7 and 17 will be embedded in the pole, and the structure will be prevented from slipping downwardly. If the pole is of sufficiently large diameter, then the end of the part 6 and the points 16 will bite into the pole. The arms 12 engage the stop 8 under the weight of the occupant, and a downward swinging movement of the outer end of the support is prevented. Since the hanger 2 is offset outwardly, a pot of paint or a kit of tools may be suspended from the opening 3 without striking the pole.

Having thus described the invention what is claimed is:—

1. A detachable pole scaffold comprising a main member embodying an upright shank the upper end of which is fashioned into a transverse pole-inclosing hook, the lower end of the shank merging into a depending article-hanger; a transverse support comprising a U-shaped part forming a seat, the U-shaped part including side portions which are twisted to form arms located on opposite sides of the shank, the arms terminating in laterally extended pole-engaging branches; a pivot element connecting the arms and the shank; and a stop mounted on the hanger, the hanger being outwardly offset with respect to the shank to enable the hanger to carry an article out of contact with a pole, and to dispose the stop outwardly with respect to the pivot element whereby the stop may coöperate with the arms and uphold the support.

2. A detachable pole-scaffold comprising a main member embodying an upright shank the upper end of which is fashioned into a transverse pole-inclosing hook, the lower end of the shank merging into a depending article-hanger; a transverse pole-engaging support; a pivot element connecting the intermediate portion of the support with the shank; and a stop on the hanger, the hanger being outwardly offset with respect to the shank to enable the hanger to carry an article out of contact with a pole, and to dispose the stop outwardly with respect to the pivot element, whereby the stop may coöperate with the support and uphold the outer end thereof.

3. A detachable pole-scaffold comprising a main member provided at its upper end with a transverse pole inclosing hook; and a support pivoted intermediate its ends to the lower portion of the hanger, the inner end of the support having oppositely extended branches, the branches being pointed to engage a pole of large diameter; and prongs on the inner surfaces of the branches for engaging a pole of small diameter.

In testimony that I claim the foregoing as my own, I have hereto affixed my signature in the presence of two witnesses.

WILLIAM G. LOONEY.

Witnesses:
A. T. LOONEY,
MILES SHORTRIDGE.

Copies of this patent may be obtained for five cents each, by addressing the "Commissioner of Patents, Washington, D. C."